United States Patent
Takeuchi et al.

(10) Patent No.: US 8,334,748 B2
(45) Date of Patent: Dec. 18, 2012

(54) METHOD FOR MANUFACTURING CERAMIC ELECTRONIC COMPONENT AND CERAMIC ELECTRONIC COMPONENT

(75) Inventors: Syunsuke Takeuchi, Nagaokakyo (JP);
Teruyo Katayama, Nagaokakyo (JP);
Toshiyuki Iwanaga, Nagaokakyo (JP);
Akihiro Motoki, Nagaokakyo (JP);
Makoto Ogawa, Nagaokakyo (JP);
Kenichi Kawasaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/357,671

(22) Filed: Jan. 25, 2012

(65) Prior Publication Data

US 2012/0188683 A1    Jul. 26, 2012

(30) Foreign Application Priority Data

Jan. 26, 2011 (JP) ................ 2011-014225
Dec. 28, 2011 (JP) ................ 2011-288154

(51) Int. Cl.
*H01F 5/00* (2006.01)
(52) U.S. Cl. ...................................... 336/200
(58) Field of Classification Search ............ 336/65, 336/83, 192, 200, 232; 361/321; 29/602.1, 29/609, 825, 842, 846, 851
See application file for complete search history.

(56) References Cited

U.S. PATENT DOCUMENTS

| | | | |
|---|---|---|---|
| 5,312,581 A * | 5/1994 | Amano et al. ............... 419/8 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2007/0211406 A1* | 9/2007 | Hara et al. ............... 361/305 |
| 2008/0068778 A1* | 3/2008 | Taniguchi et al. ......... 361/321.4 |
| 2008/0123248 A1 | 5/2008 | Kunishi et al. | |
| 2008/0123249 A1 | 5/2008 | Kunishi et al. | |
| 2008/0145551 A1 | 6/2008 | Kunishi et al. | |

(Continued)

FOREIGN PATENT DOCUMENTS

| | | |
|---|---|---|
| JP | 2007-036003 A | 2/2007 |
| WO | 2007/049456 A1 | 5/2007 |
| WO | 2007/105395 A1 | 9/2007 |

OTHER PUBLICATIONS

Kunishi et al., "Laminated Electronic Component and Method for Manufacturing the Same", U.S. Appl. No. 12/030,282, filed Feb. 13, 2008.

(Continued)

*Primary Examiner* — Tuyen Nguyen
(74) *Attorney, Agent, or Firm* — Keating & Bennett, LLP (57) ABSTRACT

A method for manufacturing a ceramic electronic component includes the steps of preparing a ceramic body including a plurality of first internal electrodes and a plurality of second internal electrodes, processing the ceramic body to an internal electrode exposure rate of about 102% to about 153%, and plating the processed ceramic body to form a plated layer thereon.

8 Claims, 7 Drawing Sheets

U.S. PATENT DOCUMENTS

2008/0158774 A1    7/2008  Trinh
2011/0051314 A1*   3/2011  Sakurai et al. ............. 361/321.1
2012/0073129 A1*   3/2012  Abe et al. ........................ 29/825

OTHER PUBLICATIONS

Kunishi et al., "Laminated Electronic Component and Method for Manufacturing the Same", U.S. Appl. No. 12/030,360, filed Feb. 13, 2008.

Tani, "Multilayer Electronic Component and Method for Manufacturing the Same", U.S. Appl. No. 12/481,690, filed Jun. 10, 2009.

Ito et al., "Laminated Ceramic Electronic Component", U.S. Appl. No. 12/489,631, filed Jun. 23, 2009.

Sasabayashi, "Multilayer Ceramic Electronic Component", U.S. Appl. No. 12/765,965, filed Apr. 23, 2010.

Sasabayashi et al., "Electronic Component", U.S. Appl. No. 13/092,996, filed Apr. 25, 2010.

* cited by examiner

METHOD FOR MANUFACTURING CERAMIC ELECTRONIC COMPONENT AND CERAMIC ELECTRONIC COMPONENT

BACKGROUND OF THE INVENTION

1. Field of the Invention

The present invention relates to methods for manufacturing ceramic electronic components and to ceramic electronic components.

2. Description of the Related Art

Ceramic electronic components such as monolithic ceramic capacitors have been extensively used in the related art. An example is disclosed in International Publication No. WO2007/049456 A1. A multilayer ceramic electronic component according to this publication includes a rectangular ceramic body, first and second internal electrodes, and first and second external electrodes. The first and second internal electrodes are disposed opposite to each other in the thickness direction in the ceramic body. The first internal electrodes extend to one of the end surfaces of the ceramic body. The second external electrodes extend to the other end surface of the ceramic body. The first external electrode is formed on one of the end surfaces of the ceramic body and is electrically connected to the first internal electrodes. The second external electrode is formed on the other end surfaces of the ceramic body and is electrically connected to the second internal electrodes.

The above publication also discloses a method for manufacturing the multilayer ceramic electronic component by forming the first and second external electrodes on the end surfaces of a ceramic body including the first and second internal electrodes by plating.

The method according to the above publication, however, may inappropriately form the first and second external electrodes.

SUMMARY OF THE INVENTION

Accordingly, preferred embodiments of the present invention provide a method by which a ceramic electronic component can be appropriately manufactured so as to include a substantially rectangular ceramic body, internal electrodes extending to surfaces of the ceramic body, and external electrodes electrically connected to the internal electrodes and formed of a plated material.

A preferred embodiment of the present invention provides a method for manufacturing a ceramic electronic component including a substantially rectangular ceramic body, a plurality of first internal electrodes, a plurality of second internal electrodes, a first external electrode, and a second external electrode. The ceramic body includes six surfaces including a pair of surfaces extending in a length direction and a width direction perpendicular to the length direction, a pair of surfaces extending in the length direction and a thickness direction perpendicular to the length direction and the width direction, and a pair of surfaces extending in the width direction and the thickness direction. The first internal electrodes are disposed in the ceramic body and extend to at least one of the six surfaces of the ceramic body. The second internal electrodes are disposed opposite to the first internal electrodes in the ceramic body and extend to at least one of the six surfaces of the ceramic body. The first external electrode is disposed on the ceramic body and is connected to the first internal electrodes. The second external electrode is disposed on the ceramic body and is connected to the second internal electrodes. The first and second internal electrodes include opposing portions disposed opposite to each other and lead portions that are not disposed opposite to each other. The lead portions are connected to the opposing portions and extend to the surfaces of the ceramic body. The first and second external electrodes each include a plated layer formed by plating on the ceramic body. The method includes the steps of preparing a ceramic body including the first and second internal electrodes, processing the ceramic body to a first internal electrode exposure rate of, for example, about 102% to about 153% and a second internal electrode exposure rate of about 102% to about 153%, and plating the processed ceramic body to form the plated layer thereon. The first internal electrode exposure rate is the proportion of the exposure rate of the lead portions of the first internal electrodes in the surface to which the first internal electrodes extend to the exposure rate of the lead portions of the first internal electrodes in a cross-section of the ceramic body parallel or substantially parallel to the surface to which the first internal electrodes extend ((exposure rate of lead portions of first internal electrodes in the surface to which first internal electrodes extend)/(exposure rate of lead portions of first internal electrodes in cross-section of ceramic body parallel or substantially parallel to the surface to which first internal electrodes extend)). The second internal electrode exposure rate is the proportion of the exposure rate of the lead portions of the second internal electrodes in the surface to which the second internal electrodes extend to the exposure rate of the lead portions of the second internal electrodes in a cross-section of the ceramic body parallel or substantially parallel to the surface to which the second internal electrodes extend ((exposure rate of lead portions of second internal electrodes in the surface to which second internal electrodes extend)/(exposure rate of lead portions of second internal electrodes in cross-section of ceramic body parallel or substantially parallel to the surface to which second internal electrodes extend)).

In one particular preferred embodiment, the pair of surfaces of the ceramic body extending in the length direction and the width direction may be first and second main surfaces, the pair of surfaces of the ceramic body extending in the length direction and the thickness direction may be first and second side surfaces, and the pair of surfaces of the ceramic body extending in the width direction and the thickness direction may be first and second end surfaces. The opposing portions of the first internal electrodes may be arranged in the thickness direction in the ceramic body, and the lead portions of the first internal electrodes may extend to the first end surface. The opposing portions of the second internal electrodes may be disposed between the first internal electrodes adjacent in the thickness direction in the ceramic body, and the lead portions of the second internal electrodes may extend to the second end surface.

In one particular preferred embodiment, the pair of surfaces of the ceramic body extending in the length direction and the width direction may be first and second main surfaces, the pair of surfaces of the ceramic body extending in the length direction and the thickness direction may be first and second side surfaces, and the pair of surfaces of the ceramic body extending in the width direction and the thickness direction may be first and second end surfaces. The opposing portions of the first internal electrodes may be arranged in the width direction in the ceramic body, and the lead portions of the first internal electrodes may extend to at least one of the first and second main surfaces. The opposing portions of the second internal electrodes may be disposed between the first internal electrodes adjacent in the width direction in the ceramic body, and the lead portions of the second internal electrodes may extend to at least one of the first and second main surfaces.

In one particular preferred embodiment, the ceramic body may be polished by barreling in the processing step.

In one particular preferred embodiment, the plated layer may be formed in the plating step by putting the processed ceramic body and conductive media balls in a plating bath and stirring the plating bath.

According to various preferred embodiments of the present invention, a ceramic electronic component includes a substantially rectangular ceramic body, a plurality of first internal electrodes, a plurality of second internal electrodes, a first external electrode, and a second external electrode. The ceramic body includes six surfaces including a pair of surfaces extending in a length direction and a width direction perpendicular or substantially perpendicular to the length direction, a pair of surfaces extending in the length direction and a thickness direction perpendicular or substantially perpendicular to the length direction and the width direction, and a pair of surfaces extending in the width direction and the thickness direction. The first internal electrodes are disposed in the ceramic body and extend to at least one of the six surfaces of the ceramic body. The second internal electrodes are disposed opposite to the first internal electrodes in the ceramic body and extend to at least one of the six surfaces of the ceramic body. The first external electrode is disposed on the ceramic body and is connected to the first internal electrodes. The second external electrode is disposed on the ceramic body and is connected to the second internal electrodes. The first and second internal electrodes include opposing portions disposed opposite to each other and lead portions that are not disposed opposite to each other. The lead portions are connected to the opposing portions and extend to the surfaces of the ceramic body. The first and second external electrodes each include a plated layer formed by plating on the ceramic body. The ceramic electronic component has a first internal electrode exposure rate of, for example, about 102% to about 153% and a second internal electrode exposure rate of about 102% to about 153%. The first internal electrode exposure rate is the proportion of the exposure rate of the lead portions of the first internal electrodes in the surface to which the first internal electrodes extend to the exposure rate of the lead portions of the first internal electrodes in a cross-section of the ceramic body parallel or substantially parallel to the surface to which the first internal electrodes extend ((exposure rate of lead portions of first internal electrodes in the surface to which first internal electrodes extend)/(exposure rate of lead portions of first internal electrodes in cross-section of ceramic body parallel or substantially parallel to the surface to which first internal electrodes extend)). The second internal electrode exposure rate is the proportion of the exposure rate of the lead portions of the second internal electrodes in the surface to which the second internal electrodes extend to the exposure rate of the lead portions of the second internal electrodes in a cross-section of the ceramic body parallel or substantially parallel to the surface to which the second internal electrodes extend ((exposure rate of lead portions of second internal electrodes in the surface to which second internal electrodes extend)/(exposure rate of lead portions of second internal electrodes in cross-section of ceramic body parallel or substantially parallel to the surface to which second internal electrodes extend)).

In one particular preferred embodiment, the pair of surfaces of the ceramic body extending in the length direction and the width direction may be first and second main surfaces, the pair of surfaces of the ceramic body extending in the length direction and the thickness direction may be first and second side surfaces, and the pair of surfaces of the ceramic body extending in the width direction and the thickness direction may be first and second end surfaces. The opposing portions of the first internal electrodes may be arranged in the thickness direction in the ceramic body, and the lead portions of the first internal electrodes may extend to the first end surface. The opposing portions of the second internal electrodes may be disposed between the first internal electrodes adjacent in the thickness direction in the ceramic body, and the lead portions of the second internal electrodes may extend to the second end surface.

In one particular preferred embodiment, the pair of surfaces of the ceramic body extending in the length direction and the width direction may be first and second main surfaces, the pair of surfaces of the ceramic body extending in the length direction and the thickness direction may be first and second side surfaces, and the pair of surfaces of the ceramic body extending in the width direction and the thickness direction may be first and second end surfaces. The opposing portions of the first internal electrodes may be arranged in the width direction in the ceramic body, and the lead portions of the first internal electrodes may extend to at least one of the first and second main surfaces. The opposing portions of the second internal electrodes may be disposed between the first internal electrodes adjacent in the width direction in the ceramic body, and the lead portions of the second internal electrodes may extend to at least one of the first and second main surfaces.

According to various preferred embodiments of the present invention, a method is provided by which a ceramic electronic component can be appropriately manufactured so as to include a substantially rectangular ceramic body, internal electrodes extending to surfaces of the ceramic body, and external electrodes electrically connected to the internal electrodes and formed of a plating.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A method for manufacturing a ceramic electronic component 1, shown in FIG. 1, according to a first preferred embodiment of the present invention will now be described. The following method for manufacturing the ceramic electronic component 1 is merely illustrative and should not be construed as limiting in any way.

Figure 1:
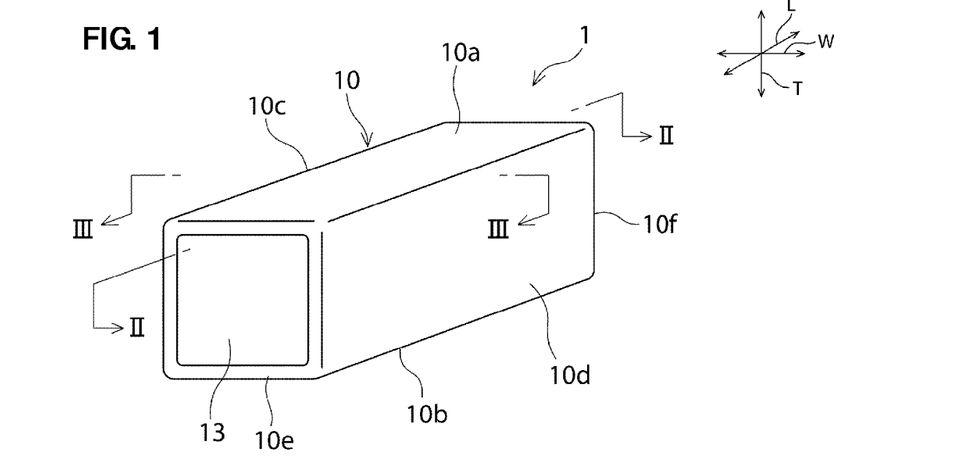
FIG. 1 is a schematic perspective view of a ceramic electronic component according to a first preferred embodiment of the present invention.
Figure 2:
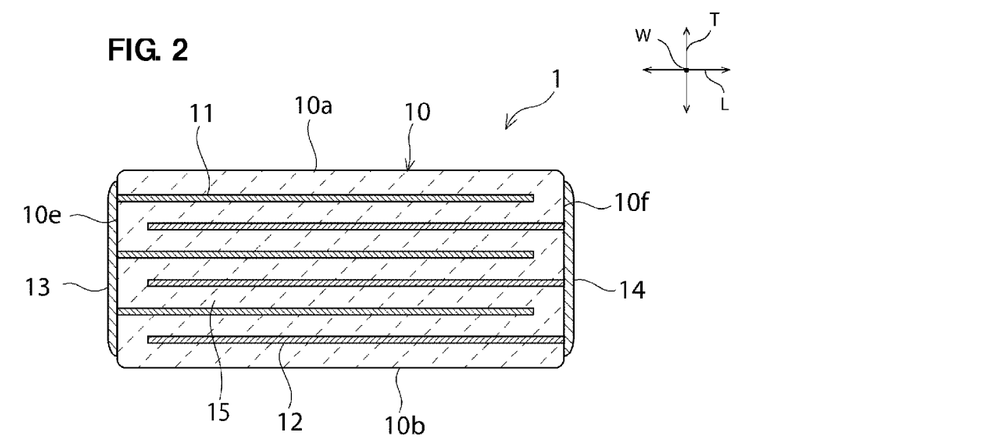
FIG. 2 is a schematic sectional view taken along line II-II in FIG. 1.
Figure 3:
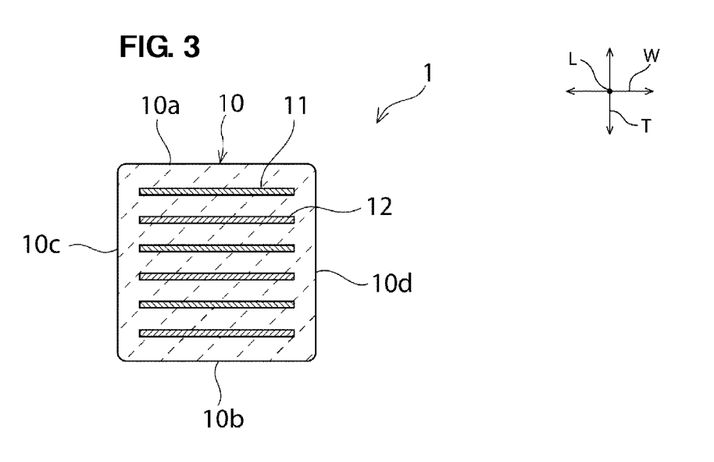
FIG. 3 is a schematic sectional view taken along line III-III in FIG. 1.

FIG. 1 is a schematic perspective view of the ceramic electronic component 1 according to this preferred embodiment. FIG. 2 is a schematic sectional view taken along line II-II in FIG. 1. FIG. 3 is a schematic sectional view taken along line III-III in FIG. 1. The structure of the ceramic electronic component 1 manufactured in this preferred embodiment will be described first with reference to FIGS. 1 to 3.

As shown in FIGS. 1 to 3, the ceramic electronic component 1 includes a ceramic body 10. The ceramic body 10 preferably has a substantially rectangular shape. The ceramic body 10 includes first and second main surfaces 10a and 10b, first and second side surfaces 10c and 10d, and first and second end surfaces 10e and 10f. The first and second main surfaces 10a and 10b extend in a length direction L and a width direction W. The first and second side surfaces 10c and 10d extend in the length direction L and a thickness direction T. The first and second end surfaces 10e and 10f extend in the width direction W and the thickness direction T. The length direction L and the width direction W are perpendicular to each other. The thickness direction T is perpendicular to the length direction L and the width direction W.

As used herein, the term "rectangular" encompasses rectangular shapes with rounded corners or ridges. That is, the ceramic body 10 may have a substantially rectangular shape with at least partially rounded corners or ridges.

In this preferred embodiment, the ceramic body 10 includes a plurality of ceramic layers 15 stacked on top of each other in the thickness direction T. The ceramic layers 15 preferably each have a thickness of about 0.5 μm to about 10 μm, for example.

The ceramic body 10 is formed of an appropriate ceramic material. The ceramic material for the ceramic body 10 is appropriately selected based on, for example, the characteristics of the ceramic electronic component 1.

If the ceramic electronic component 1 is, for example, a ceramic capacitor, the ceramic body 10 may be formed of a material mainly containing a dielectric ceramic. Examples of dielectric ceramics include $BaTiO_3$, $CaTiO_3$, $SrTiO_3$, and $CaZrO_3$. The ceramic body 10 may optionally contain a subcomponent such as a manganese compound, an iron compound, a chromium compound, a cobalt compound, or a nickel compound.

If the ceramic electronic component 1 is, for example, a ceramic piezoelectric device, the ceramic body 10 may be formed of, for example, a material mainly containing a piezoelectric ceramic. Examples of piezoelectric ceramics include lead zirconate titanate (PZT) based ceramics.

If the ceramic electronic component 1 is, for example, a thermistor, the ceramic body 10 may be formed of, for example, a semiconductor ceramic. Examples of semiconductor ceramics include spinel ceramics.

If the ceramic electronic component 1 is, for example, an inductor, the ceramic body 10 may be formed of a magnetic ceramic. Examples of magnetic ceramics include ferrite ceramics.

The ceramic body 10 includes a plurality of first internal electrodes 11 and a plurality of second internal electrodes 12. The first and second internal electrodes 11 and 12 are arranged in the thickness direction T in the ceramic body 10. The first and second internal electrodes 11 and 12 are alternately arranged in the thickness direction T. Accordingly, the second internal electrodes 12 are located between the first internal electrodes 11 adjacent in the thickness direction T. The first and second internal electrodes 11 and 12 are partially disposed opposite to each other with the ceramic layers 15 therebetween in the thickness direction T. The first internal electrodes 11 extend to the first end surface 10e. The first internal electrodes 11 are not exposed in the second end surface 10f, the first and second main surfaces 10a and 10b, and the first and second side surfaces 10c and 10d. The second internal electrodes 12 extend to the second end surface 10f. The second internal electrodes 12 are not exposed in the first end surface 10e, the first and second main surfaces 10a and 10b, and the first and second side surfaces 10c and 10d.

The first and second internal electrodes 11 and 12 include opposing portions disposed opposite to each other in the thickness direction T and lead portions that are not disposed opposite to each other in the thickness direction T. The lead portions are connected to the opposing portions and extend to the first end surface 10e or the second end surface 10f. In this preferred embodiment, the opposing portions preferably have the same width as the lead portions in the width direction W. Accordingly, the first and second internal electrodes 11 and 12 preferably are substantially rectangular.

The adjacent first internal electrodes 11 may be connected together in the first end surface 10e. If the adjacent first internal electrodes 11 are separated in the first end surface 10e, the distance therebetween is preferably about 7 μm or less, for example. This allows the regions between the internal electrodes 11 in the first end surface 10e to be reliably plated. Similarly, the adjacent second internal electrodes 12 may be connected together in the second end surface 10f. If the adjacent second internal electrodes 12 are separated in the second end surface 10f, the distance therebetween is preferably about 7 μm or less, for example. This allows the regions between the internal electrodes 12 in the second end surface 10f to be reliably plated.

The first and second internal electrodes 11 and 12 preferably each have a thickness of about 0.3 μm to about 2.0 μm, for example.

A first external electrode 13 is disposed on the first end surface 10e of the ceramic body 10. The first external electrode 13 is connected to the first internal electrodes 11. A second external electrode 14 is disposed on the second end surface 10f of the ceramic body 10. The second external electrode 14 is connected to the second internal electrodes 12.

While the first and second external electrodes 13 and 14 preferably are formed only on the first and second end surfaces 10e and 10f, respectively, in this preferred embodiment, they may partially cover the main surfaces 10a and 10b and the side surfaces 10c and 10d.

In this preferred embodiment, the first and second external electrodes 13 and 14 are each formed of a plated layer. The first and second external electrodes 13 and 14 may further include a layer stacked on the plated layer on the ceramic body 10. Alternatively, the first and second external electrodes 13 and 14 may include a plurality of plated layers stacked on top of each other. The plated layers preferably each have a thickness of about 1 μm to about 15 μm, for example. The first and second external electrodes 13 and 14 may be formed of, for example, a metal selected from the group consisting of copper, nickel, silver, palladium, silver-palladium alloy, gold, tin, lead, bismuth, and zinc, or an alloy containing the metal. The plated layer(s) preferably contains no glass component. The plated layer(s) preferably has a metal content per unit volume of about 99% by volume or more, for example.

The first and second internal electrodes 11 and 12 and the first and second external electrodes 13 and 14 may be formed of any conductive material. The first and second internal electrodes 11 and 12 may be formed of, for example, a metal such as nickel, copper, silver, palladium, or gold or an alloy containing at least one such metal. The plated layer(s) for the first and second external electrodes 13 and 14 may be formed of, for example, a metal such as copper, nickel, tin, lead, gold, silver, palladium, bismuth, or zinc or an alloy containing at least one such metal.

The first and second internal electrodes 11 and 12 and the first and second external electrodes 13 and 14 are preferably formed of materials that have good adhesion to each other. For example, if the first and second internal electrodes 11 and 12 are formed of nickel or nickel alloy, the first and second external electrodes 13 and 14 are preferably formed of copper or copper alloy plating.

Figure 4:
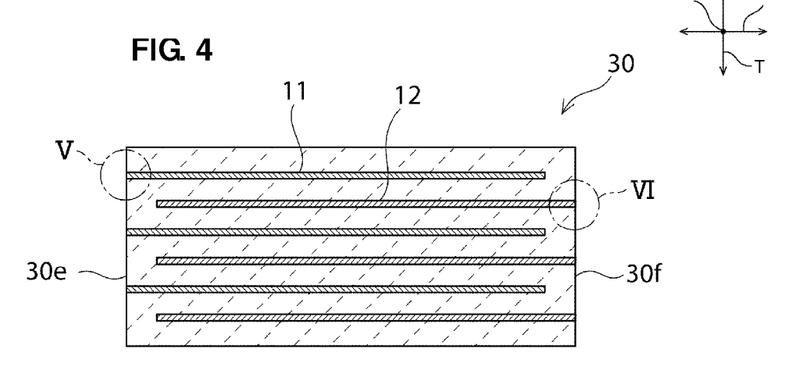
FIG. 4 is a schematic sectional view of a ceramic body before barrel polishing in the first preferred embodiment of the present invention.
Figure 5:
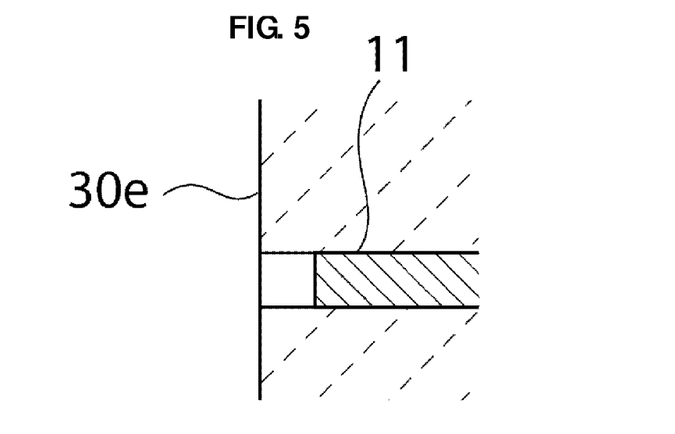
FIG. 5 is a schematic sectional view showing in an enlarged view the portion enclosed by circle V in FIG. 4.
Figure 6:
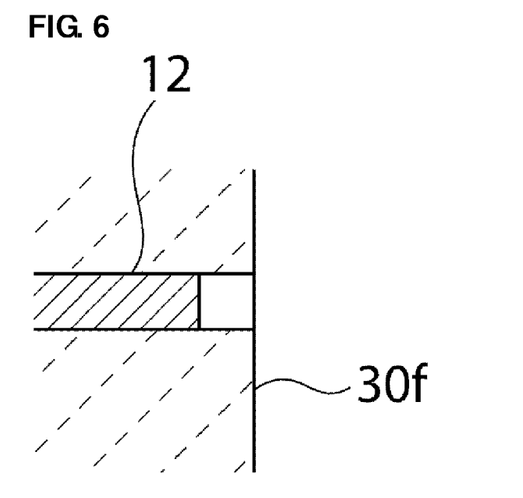
FIG. 6 is a schematic sectional view showing in an enlarged view the portion enclosed by circle VI in FIG. 4.
Figure 7:
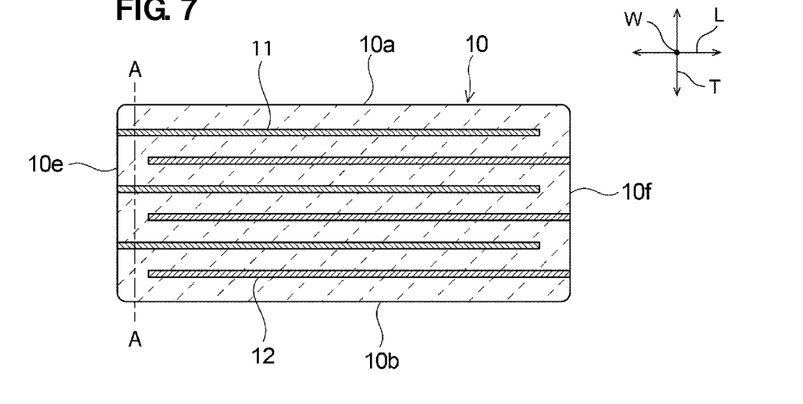
FIG. 7 is a schematic sectional view of a ceramic body after barrel polishing in the first preferred embodiment of the present invention.
Figure 8:
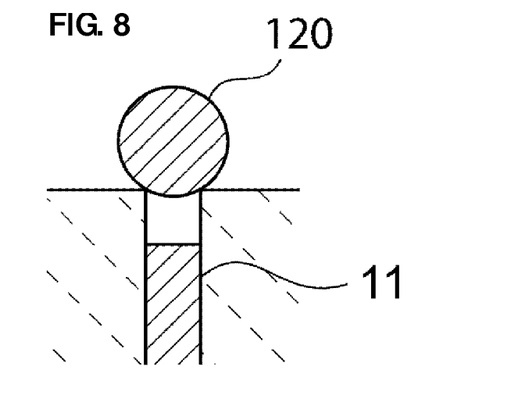
FIG. 8 is a schematic sectional view illustrating a plating step in the first preferred embodiment of the present invention.

FIG. 4 is a schematic sectional view of a ceramic body before barrel polishing in this preferred embodiment. FIG. 5 is a schematic sectional view showing in an enlarged view the portion enclosed by circle V in FIG. 4. FIG. 6 is a schematic sectional view showing in an enlarged view the portion enclosed by circle VI in FIG. 4. FIG. 7 is a schematic sectional view of a ceramic body after barrel polishing in this preferred embodiment. FIG. 8 is a schematic sectional view illustrating a plating step in this preferred embodiment. An example of a method for manufacturing the ceramic electronic component 1 will now be described in detail, mainly with reference to FIGS. 4 to 8 as well as FIG. 1.

First, ceramic green sheets for forming the ceramic body 10 are prepared. The ceramic green sheets can be formed by, for example, a printing process such as screen printing.

Internal electrode patterns are then printed on the ceramic green sheets with a conductive paste. The internal electrode patterns are printed by, for example, screen printing. The paste used for printing the internal electrode patterns may be a paste containing conductive particles, an organic binder, and an organic solvent.

A mother laminate is then formed by stacking a plurality of ceramic green sheets for forming an outer layer on which no internal electrode pattern is printed on top of each other, further stacking the ceramic green sheets on which the internal electrode patterns are printed, and further stacking a plurality of ceramic green sheets for forming an outer layer on which no internal electrode pattern is printed. The mother laminate may be pressed in the stacking direction by, for example, isostatic pressing.

The green ceramic laminate is then fired to form a ceramic body 30 shown in FIG. 4. The firing temperature may be appropriately set depending on, for example, the composition of the ceramic laminate. The firing temperature may be, for example, about 900° C. to about 1,300° C.

The ceramic green sheets and the internal electrode patterns differ in shrinkage during firing. In general, the internal electrode patterns exhibit a higher shrinkage than the ceramic green sheets. As shown in FIGS. 5 and 6, therefore, the first and second internal electrodes 11 and 12, formed by firing the internal electrode patterns, are retracted from the end surfaces 30e and 30f of the ceramic body 30. In this state, as shown in FIG. 8, media balls 120 used to perform plating of the end surfaces 30e and 30f of the ceramic body 30 from the first and second internal electrodes 11 and 12 may fail to contact the first and second internal electrodes 11 and 12. Consequently, the first and second external electrodes 13 and 14 may be inappropriately formed because plating does not grow well from the first and second internal electrodes 11 and 12.

In this preferred embodiment, the ceramic body 30 is processed before the step of forming the first and second external electrodes 13 and 14 by plating. Specifically, the end surfaces 30e and 30f of the ceramic body 30 are polished by wet barreling to expose the first and second internal electrodes 11 and 12. In this way, the ceramic body 10 shown in FIG. 7 is obtained. Specifically, the ceramic body 10 is polished to an internal electrode exposure rate of about 102% to about 153% by wet barrel polishing, for example.

As used herein, the term "internal electrode exposure rate" encompasses both the first internal electrode exposure rate and the second internal electrode exposure rate. The term "first internal electrode exposure rate" refers to the proportion of the exposure rate of the lead portions of the first internal electrodes in the surface to which the first internal electrodes extend to the exposure rate of the lead portions of the first internal electrodes in a cross-section of the ceramic body parallel or substantially parallel to that surface ((exposure rate of lead portions of first internal electrodes in the surface to which first internal electrodes extend)/(exposure rate of lead portions of first internal electrodes in cross-section of ceramic body parallel or substantially parallel to the surface to which first internal electrodes extend)). The term "second internal electrode exposure rate" refers to the proportion of the exposure rate of the lead portions of the second internal electrodes in the surface to which the second internal electrodes extend to the exposure rate of the lead portions of the second internal electrodes in a cross-section of the ceramic body parallel to that surface ((exposure rate of lead portions of second internal electrodes in the surface to which second internal electrodes extend)/(exposure rate of lead portions of second internal electrodes in cross-section of ceramic body parallel or substantially parallel to the surface to which second internal electrodes extend)).

In this preferred embodiment, specifically, the ceramic body 10 is polished by wet barrel polishing such that the proportion of the exposure rate of the lead portions of the first internal electrodes 11 in the first end surface 10e, to which the first internal electrodes 11 extend, to the exposure rate of the lead portions of the first internal electrodes 11 in a cross-section of the ceramic body 10 parallel or substantially parallel to the first end surface 10e ((exposure rate of lead portions of first internal electrodes 11 in first end surface 10e to which first internal electrodes 11 extend)/(exposure rate of lead portions of first internal electrodes 11 in cross-section of ceramic body 10 parallel or substantially parallel to first end surface 10e)) and the proportion of the exposure rate of the lead portions of the second internal electrodes 12 in the second end surface 10f, to which the second internal electrodes 12 extend, to the exposure rate of the lead portions of the second internal electrodes 12 in a cross-section of the ceramic body 10 parallel or substantially parallel to the second end surface 10f ((exposure rate of lead portions of second internal electrodes 12 in second end surface 10f to which second internal electrodes 12 extend)/(exposure rate of lead portions of second internal electrodes 12 in cross-section of ceramic body 10 parallel or substantially parallel to second end surface 10f)) are both about 102% to about 153%, for example.

The ceramic body 10 may be polished by a process other than wet barrel polishing, such as dry barrel polishing or sand blasting.

As used herein, the term "internal electrode exposure rate" refers to the proportion of the exposure rate of the first and second internal electrodes 11 and 12 in the first and second end surfaces 10e and 10f to the exposure rate of the first and second internal electrodes 11 and 12 in a cross-section of the ceramic body 10 taken in the width direction W and the thickness direction T ((exposure rate of first and second internal electrodes 11 and 12 in first and second end surfaces 10e and 10f)/(exposure rate of first and second internal electrodes 11 and 12 in cross-section of ceramic body 10 taken in width direction W and thickness direction T)). The internal electrode exposure rate can be measured as follows. First, energy-dispersive X-ray spectroscopy (EDX) mapping is performed on the end surfaces 10e and 10f to calculate the proportion of the content of a particular component in the internal electrodes 11 and 12 to the content of a particular component in the ceramic body 10 in the end surfaces 10e and 10f ((content of particular component in internal electrodes 11 and 12)/(content of particular component in ceramic body 10)). For example, if the internal electrodes 11 and 12 mainly contain nickel and the ceramic body 10 mainly contains titanium or barium, the proportion of the content of a major component in the internal electrodes 11 and 12 to that of a major component in the ceramic body 10, namely, Ni/Ti or Ni/Ba, in the end surfaces 10e and 10f is calculated. In the Examples below, Ni/Ba was calculated.

If the first internal electrodes 11 extend to the first end surface 10e in substantially the same manner that the second internal electrodes 12 extend to the second end surface 10f, the first and second internal electrode exposure rates are substantially equal. Accordingly, if the first internal electrode exposure rate falls within a predetermined range, the second internal electrode exposure rate can be assumed to fall within the predetermined range. Thus, only one of the first and second internal electrode exposure rates needs to be evaluated.

The end surfaces 10e and 10f of the ceramic body 10 are then polished to a depth of about 10 μm, for example, to expose a cross-section. The proportion of the content of a particular component in the internal electrodes 11 and 12 to the content of a particular component in the ceramic body 10 ((content of particular component in internal electrodes 11 and 12)/(content of particular component in ceramic body 10)) in the cross-section is calculated. For example, the Ni/Ba in the cross-section is calculated. The internal electrode exposure rate can be calculated by dividing ((content of particular component in internal electrodes 11 and 12)/(content of particular component in ceramic body 10)) in the end surfaces 10e and 10f by ((content of particular component in internal electrodes 11 and 12)/(content of particular component in ceramic body 10)) in the cross-section. While the end surfaces 10e and 10f of the ceramic body 10 are polished preferably to a depth of about 10 μm, for example, in this preferred embodiment, they do not necessarily have to be polished to a depth of about 10 μm as long as only the first internal electrodes 11 or the second internal electrodes 12, rather than both, are exposed in each of the end surfaces 10e and 10f of the ceramic body 10.

That is, the internal electrode exposure rate is represented as follows: (((content of particular component in internal electrodes 11 and 12)/(content of particular component in ceramic body 10)) in end surfaces 10e and 10f)/((((content of particular component in internal electrodes 11 and 12)/(content of particular component in ceramic body 10)) in cross-section). For example, if the internal electrodes 11 and 12 mainly contain nickel and the ceramic body 10 mainly contains barium, the internal electrode exposure rate is represented as follows: (Ni/Ba in end surfaces 10e and 10f)/(Ni/Ba in cross-section).

A plating step is then performed to form a plated layer to form the first and second external electrodes 13 and 14. Specifically, the plated layer is formed preferably by putting the ceramic body 10 and conductive media balls 20 in a plating bath and stirring the plating bath.

Figure 9:
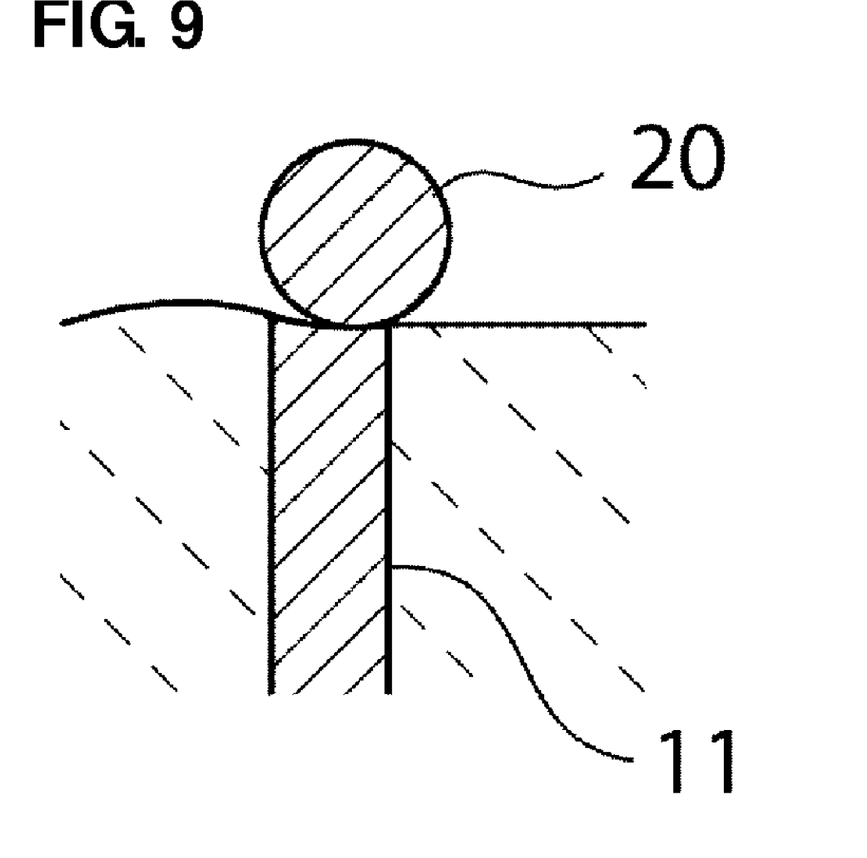
FIG. 9 is a schematic sectional view illustrating a plating step in a comparative example.

Because plating is performed on the ceramic body 10, which preferably has an internal electrode exposure rate of about 102% to about 153%, in this preferred embodiment, the conductive media balls 20 reliably contact the internal electrodes 11 and 12, as shown in FIG. 9. Thus, the plated layer to define the first and second external electrodes 13 and 14 can be reliably formed.

The plated layer may be formed either by electroplating or by electroless plating, for example. Preferably, the plated layer is formed by electroplating because electroless plating requires a pre-treatment using, for example, a catalyst and therefore tends to complicate the process of manufacturing the ceramic electronic component 1.

EXAMPLES

Non-limiting examples of ceramic electronic components having substantially the same structure as the ceramic electronic component 1 according to the above preferred embodiment were fabricated under the following conditions, where 105 samples were fabricated for each of Examples 1 to 6:

Size of ceramic electronic component: 1.0 mm in length, 0.5 mm in width, 0.5 mm in height (dimensional tolerance: ±0.2 mm)

Material of ceramic body: barium-titanate-based dielectric ceramic

Internal electrodes: mainly nickel

Thickness of ceramic layers: 0.7 μm

Total number of internal electrodes: 445 layers

Rated voltage: 4.0 V

Capacitance: 10 μF

Barrel Polishing Conditions for Ceramic Body

Process: wet barrel polishing

Number of revolutions: 250 rpm

Media: partially stabilized zirconia (PSZ), 1 mm in diameter, 150 cc

Powder: alumina, 50 cc

Pot volume: 340 cc

Processing time: 0 min (Example 1), 10 min (Example 2), 20 min (Example 3), 30 min (Example 4), 40 min (Example 5), 50 min (Example 6)

Plating Conditions

Plating: copper plating about 5 μm thick

Plating bath: pH 8.8, 55° C.

Process: horizontal rotary barrel plating

Number of revolutions: 10 rpm

Conductive media: 1.8 mm in diameter

Current density×time: 0.30 A/dm$^2$×150 min

Calculation of Internal Electrode Exposure Rate

The internal electrode exposure rates of Examples 1 to 6 were calculated as follows, where five samples were taken for measurement for each of Examples 1 to 6.

(1) The external electrodes were removed from each sample by electrolytic stripping to expose the end surfaces of the ceramic body. Subsequently, the Ni/Ba (the proportion of nickel content to barium content) in the end surfaces of the ceramic body was determined by EDX mapping.

(2) The end surfaces of the ceramic body after polishing were polished to a depth of about 10 μm to expose a cross-section in which the internal electrodes were flush with the ceramic (the sectional view taken along line A-A in FIG. 7). The Ni/Ba (the proportion of nickel content to barium content) in the cross-section was then determined by EDX mapping.

(3) The internal electrode exposure rate was calculated from the results of Steps (1) and (2) above by the expression (Ni/Ba in end surface)/(Ni/Ba in cross-section).

Figure 10:
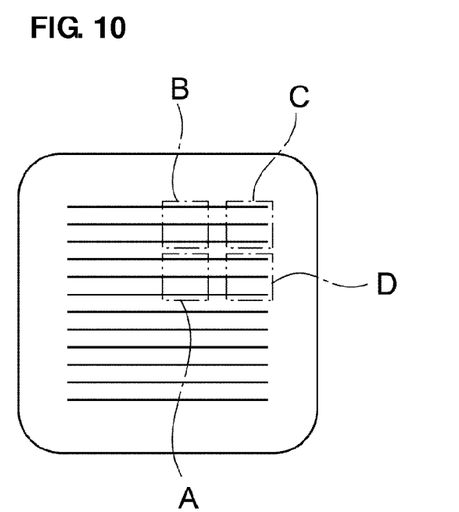
FIG. 10 is a schematic view illustrating regions for measurement of internal electrode exposure rate.

(4) The internal electrode exposure rates were calculated through Steps (1) to (3) in four regions A to D, shown in FIG. 10, having a size of about 150 μm by about 200 μm (the regions B and C are located about 20 μm closer to the center in the thickness direction than the outermost internal electrode, and the regions C and D are located about 20 μm closer to the center in the width direction than the ends of the internal electrodes in the width direction). The results are shown in Table 1 below, where the internal electrode exposure rate is the average of the internal electrode exposure rates of the five samples.

Figure 11:
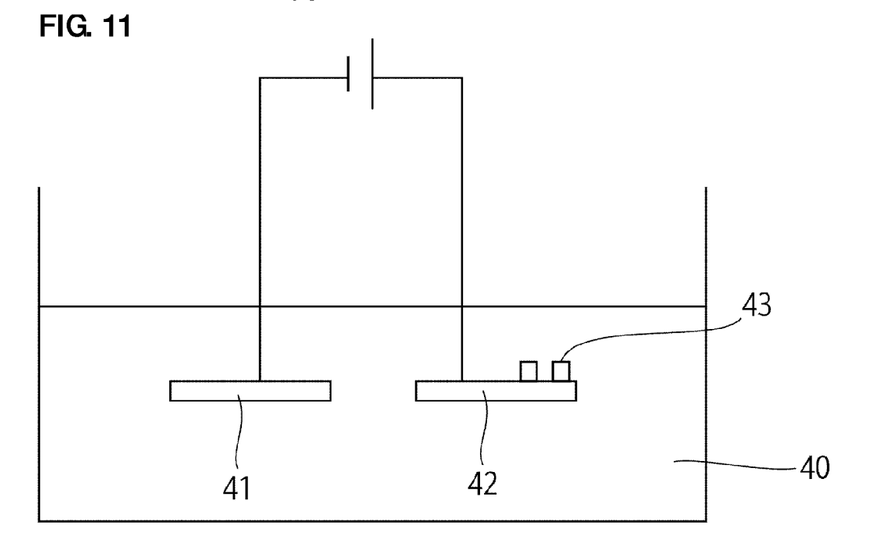
FIG. 11 is a schematic view illustrating a step of stripping external electrodes.

The internal electrode exposure rate of a ceramic electronic component can be measured by removing the external electrodes by electrolytic stripping to expose the end surfaces of the ceramic body. For example, if the external electrodes are formed of a copper plating, as shown in FIG. 11, a cathode 41 and an anode 42, both formed of a copper plate, are placed in an aqueous copper sulfate solution 40. A sample 43 for electrolytic stripping is then placed on the copper plate serving as the anode 42 and is supplied with current. This causes the copper plating on the sample 43 to dissolve into the aqueous copper sulfate solution 40. In this way, the copper plating can be removed.

For each of Examples 1 to 6, 100 samples were evaluated for the deposition of the external electrodes. Specifically, each sample was examined for whether or not the plating completely covered the internal electrodes and the regions therebetween in the surfaces of the ceramic body. The examples where it was determined that the plating completely covered the internal electrodes and the regions therebetween in the surfaces of the ceramic body for every sample were evaluated as "good," and the examples where it was determined that the plating incompletely or only partially covered the internal electrodes and the regions therebetween in the surfaces of the ceramic body for any sample were evaluated as "poor." The results are shown in Table 1 below.

The internal electrode exposure rate did not exceed about 153% even after extended barrel polishing, presumably for the following reason. The internal electrode exposure rate increases as the ceramic body is cut by barrel polishing. As the ceramic body is further cut by barrel polishing, the internal electrodes are also pressed by the media in the barrel. As a result, the internal electrodes are extended in the transverse direction so as to cover the surface of the ceramic body, thus protecting the ceramic body from being further cut by barrel polishing. Another possible reason is that the internal electrodes are no longer extended in the transverse direction by barrel polishing after being extended to a certain extent.

TABLE 1

| Ex. | Barrel polishing time (min) | Average internal electrode exposure rate (%) | | | | Deposition evaluation |
| --- | --- | --- | --- | --- | --- | --- |
| | | Region A | Region B | Region C | Region D | |
| 1 | 0 | 59 | 55 | 52 | 55 | Poor |
| 2 | 10 | 78 | 72 | 73 | 72 | Poor |
| 3 | 20 | 112 | 105 | 102 | 102 | Good |
| 4 | 30 | 132 | 123 | 119 | 120 | Good |
| 5 | 40 | 153 | 141 | 139 | 139 | Good |
| 6 | 50 | 151 | 141 | 138 | 141 | Good |

The results shown in Table 1 demonstrate that external electrodes can be reliably formed if the internal electrode exposure rate falls within the range of about 102% to about 153%, for example.

Second Preferred Embodiment

Figure 12:
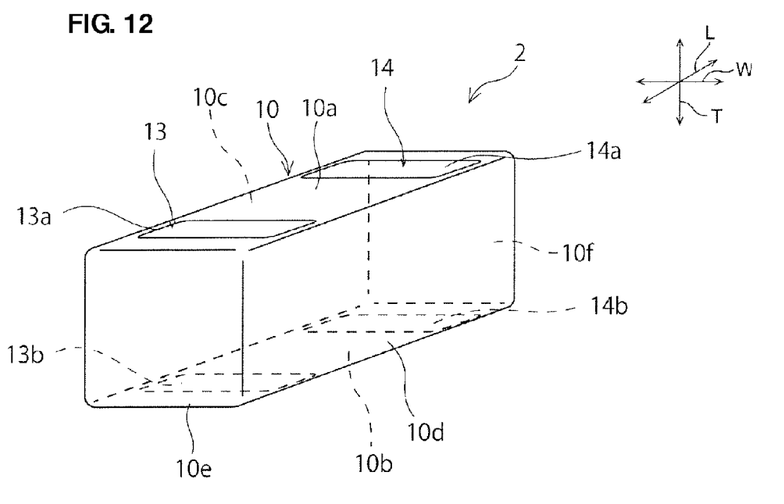
FIG. 12 is a schematic perspective view of a ceramic electronic component according to a second preferred embodiment of the present invention.
Figure 13:
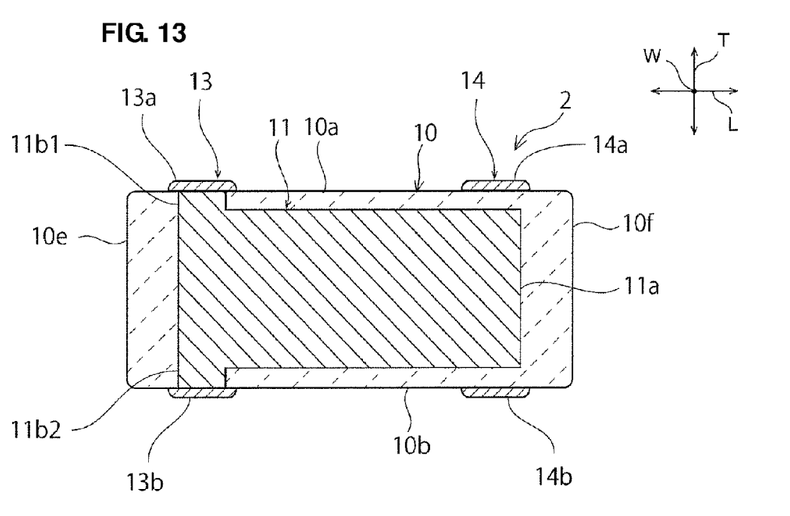
FIG. 13 is a schematic sectional view, taken in a length direction L and a thickness direction T, of the ceramic electronic component according to the second preferred embodiment of the present invention.
Figure 14:
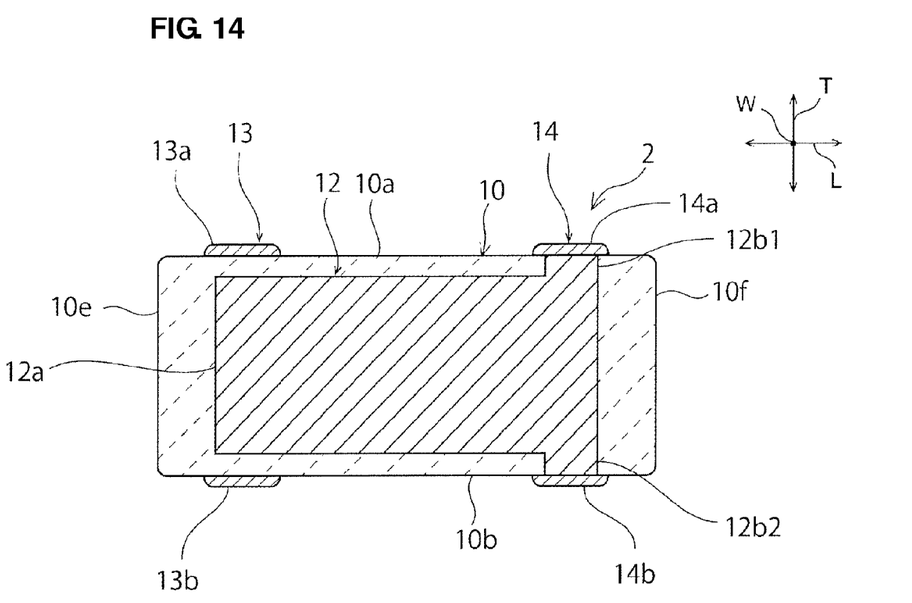
FIG. 14 is a schematic sectional view, taken in the length direction L and the thickness direction T, of the ceramic electronic component according to the second preferred embodiment of the present invention.

FIG. 12 is a schematic perspective view of a ceramic electronic component according to a second preferred embodiment of the present invention. FIG. 13 is a schematic sectional view, taken in the length direction L and the thickness direction T, of the ceramic electronic component according to the second preferred embodiment. FIG. 14 is a schematic sectional view, taken in the length direction L and the thickness direction T, of the ceramic electronic component according to the second preferred embodiment.

A ceramic electronic component 2 according to this preferred embodiment includes first internal electrodes 11 and second internal electrodes 12 that are alternately arranged at intervals in the width direction W. The first internal electrodes 11 include opposing portions 11a and lead portions 11b1 and 11b2. The second internal electrodes 12 include opposing portions 12a and lead portions 12b1 and 12b2. The opposing portions 11a are disposed opposite to the opposing portions 12a in the width direction W.

The lead portions 11b1 extend from the opposing portions 11a to the first main surface 10a. The lead portions 11b2 extend from the opposing portions 11a to the second main surface 10b.

The first external electrode 13 includes a first electrode portion 13a and a second external electrode portion 13b. The first electrode portion 13a is disposed on the first main surface 10a. The first electrode portion 13a is connected to the lead portions 11b1. The second external electrode portion 13b is disposed on the second main surface 10b. The second external electrode portion 13b is connected to the lead portions 11b2.

The lead portions 12b1 extend from the opposing portions 12a to the first main surface 10a. The lead portions 12b2 extend from the opposing portions 12a to the second main surface 10b.

The second external electrode 14 includes a first electrode portion 14a and a second external electrode portion 14b. The first electrode portion 14a is disposed on the first main surface 10a. The first electrode portion 14a is connected to the lead portions 12b1. The second external electrode portion 14b is disposed on the second main surface 10b. The second external electrode portion 14b is connected to the lead portions 12b2.

In this preferred embodiment, as in the first preferred embodiment, the first and second internal electrode exposure rates preferably are each about 102% to about 153%, for example. Accordingly, the second preferred embodiment achieves the same advantages as the first preferred embodiment.

In this preferred embodiment, specifically, the first internal electrode exposure rate is the proportion of the exposure rate of the lead portions 11b1 and 11b2 of the first internal electrodes 11 in the first and second main surfaces 10a and 10b, to which the first internal electrodes 11 extend, to the exposure rate of the lead portions 11b1 and 11b2 of the first internal electrodes 11 in a cross-section of the ceramic body 10 parallel or substantially parallel to the first and second main surfaces 10a and 10b ((exposure rate of lead portions 11b1 and 11b2 of first internal electrodes 11 in first and second main surfaces 10a and 10b to which first internal electrodes 11 extend)/(exposure rate of lead portions 11b1 and 11b2 of first internal electrodes 11 in cross-section of ceramic body 10 parallel or substantially parallel to first and second main surfaces 10a and 10b)). The second internal electrode exposure rate is the proportion of the exposure rate of the lead portions 12b1 and 12b2 of the second internal electrodes 12 in the first and second main surfaces 10a and 10b, to which the second internal electrodes 12 extend, to the exposure rate of the lead portions 12b1 and 12b2 of the second internal electrodes 12 in a cross-section of the ceramic body 10 parallel or substantially parallel to the first and second main surfaces 10a and 10b ((exposure rate of lead portions 12b1 and 12b2 of second internal electrodes 12 in first and second main surfaces 10a and 10b to which second internal electrodes 12 extend)/(exposure rate of lead portions 12b1 and 12b2 of second internal electrodes 12 in cross-section of ceramic body 10 parallel or substantially parallel to first and second main surfaces 10a and 10b)).

As shown in this preferred embodiment, the first and second internal electrodes 11 and 12 may each extend to a plurality of surfaces of the ceramic body 10. In addition, the first and second internal electrodes 11 and 12 may extend to the same or different surfaces.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a ceramic electronic component including a substantially rectangular ceramic body including six surfaces including a pair of surfaces extending in a length direction and a width direction perpendicular to the length direction, a pair of surfaces extending in the length direction and a thickness direction perpendicular to the length direction and the width direction, and a pair of surfaces extending in the width direction and the thickness direction, a plurality of first internal electrodes disposed in the ceramic body and extending to at least one of the six surfaces of the ceramic body, a plurality of second internal electrodes disposed opposite to the first internal electrodes in the ceramic body and extending to at least one of the six surfaces of the ceramic body, a first external electrode disposed on the ceramic body and connected to the first internal electrodes, and a second external electrode disposed on the ceramic body and connected to the second internal electrodes, the first and second internal electrodes including opposing portions disposed opposite to each other and lead portions that are not disposed opposite to each other, the lead portions being connected to the opposing portions and extending to the surfaces of the ceramic body, the first and second external electrodes each comprising at least one plated layer formed by plating on the ceramic body, the method comprising the steps of:

preparing the ceramic body including the plurality of first and second internal electrodes;

processing the ceramic body to a first internal electrode exposure rate of about 102% to about 153% and a second internal electrode exposure rate of about 102% to about 153%, wherein the first internal electrode exposure rate is a proportion of the exposure rate of the lead portions of the first internal electrodes in the surface to which the first internal electrodes extend to the exposure rate of the lead portions of the first internal electrodes in a cross-section of the ceramic body parallel or substantially parallel to the surface to which the first internal electrodes extend, and the second internal electrode exposure rate is a proportion of the exposure rate of the lead portions of the second internal electrodes in the surface to which the second internal electrodes extend to the exposure rate of the lead portions of the second internal electrodes in a cross-section of the ceramic body parallel or substantially parallel to the surface to which the second internal electrodes extend; and plating the processed ceramic body to form the at least one plated layer thereon.

2. The method for manufacturing the ceramic electronic component according to claim 1, wherein the pair of surfaces of the ceramic body extending in the length direction and the width direction are first and second main surfaces, the pair of surfaces of the ceramic body extending in the length direction and the thickness direction are first and second side surfaces, and the pair of surfaces of the ceramic body extending in the width direction and the thickness direction are first and second end surfaces;

the opposing portions of the first internal electrodes are arranged in the thickness direction in the ceramic body;

the lead portions of the first internal electrodes extend to the first end surface;

the opposing portions of the second internal electrodes are disposed between the first internal electrodes adjacent in the thickness direction in the ceramic body; and the lead portions of the second internal electrodes extend to the second end surface.

3. The method for manufacturing the ceramic electronic component according to claim 1, wherein the pair of surfaces of the ceramic body extending in the length direction and the width direction are first and second main surfaces, the pair of surfaces of the ceramic body extending in the length direction and the thickness direction are first and second side surfaces, and the pair of surfaces of the ceramic body extending in the width direction and the thickness direction are first and second end surfaces;

the opposing portions of the first internal electrodes being arranged in the width direction in the ceramic body;

the lead portions of the first internal electrodes extend to at least one of the first and second main surfaces;

the opposing portions of the second internal electrodes are disposed between the first internal electrodes adjacent in the width direction in the ceramic body; and the lead portions of the second internal electrodes extend to at least one of the first and second main surfaces.

4. The method for manufacturing the ceramic electronic component according to claim 1, wherein the ceramic body is polished by barrel polishing in the processing step.

5. The method for manufacturing the ceramic electronic component according to claim 1, wherein the at least one plated layer is formed in the plating step by placing the processed ceramic body and conductive media balls in a plating bath and stirring the plating bath.

6. A ceramic electronic component comprising:

a substantially rectangular ceramic body including six surfaces including a pair of surfaces extending in a length direction and a width direction perpendicular to the length direction, a pair of surfaces extending in the length direction and a thickness direction perpendicular to the length direction and the width direction, and a pair of surfaces extending in the width direction and the thickness direction;
a plurality of first internal electrodes disposed in the ceramic body and extending to at least one of the six surfaces of the ceramic body;
a plurality of second internal electrodes disposed opposite to the first internal electrodes in the ceramic body and extending to at least one of the six surfaces of the ceramic body;
a first external electrode disposed on the ceramic body and connected to the first internal electrodes; and
a second external electrode disposed on the ceramic body and connected to the second internal electrodes; wherein
the first and second internal electrodes include opposing portions disposed opposite to each other and lead portions that are not disposed opposite to each other, the lead portions being connected to the opposing portions and extending to the surfaces of the ceramic body;
the first and second external electrodes each including at least one plated layer formed by plating on the ceramic body;
the ceramic electronic component having a first internal electrode exposure rate of about 102% to about 153% and a second internal electrode exposure rate of about 102% to about 153%, wherein the first internal electrode exposure rate is a proportion of the exposure rate of the lead portions of the first internal electrodes in the surface to which the first internal electrodes extend to the exposure rate of the lead portions of the first internal electrodes in a cross-section of the ceramic body parallel or substantially parallel to the surface to which the first internal electrodes extend, and the second internal electrode exposure rate is a proportion of the exposure rate of the lead portions of the second internal electrodes in the surface to which the second internal electrodes extend to the exposure rate of the lead portions of the second internal electrodes in a cross-section of the ceramic body parallel or substantially parallel to the surface to which the second internal electrodes extend.

7. The ceramic electronic component according to claim 6, wherein the pair of surfaces of the ceramic body extending in the length direction and the width direction are first and second main surfaces, the pair of surfaces of the ceramic body extending in the length direction and the thickness direction are first and second side surfaces, and the pair of surfaces of the ceramic body extending in the width direction and the thickness direction are first and second end surfaces;
    the opposing portions of the first internal electrodes are arranged in the thickness direction in the ceramic body;
    the lead portions of the first internal electrodes extend to the first end surface;
    the opposing portions of the second internal electrodes are disposed between the first internal electrodes adjacent in the thickness direction in the ceramic body; and
    the lead portions of the second internal electrodes extend to the second end surface.

8. The method for manufacturing the ceramic electronic component according to claim 6, wherein the pair of surfaces of the ceramic body extending in the length direction and the width direction are first and second main surfaces, the pair of surfaces of the ceramic body extending in the length direction and the thickness direction are first and second side surfaces, and the pair of surfaces of the ceramic body extending in the width direction and the thickness direction are first and second end surfaces;
    the opposing portions of the first internal electrodes are arranged in the width direction in the ceramic body;
    the lead portions of the first internal electrodes extend to at least one of the first and second main surfaces;
    the opposing portions of the second internal electrodes are disposed between the first internal electrodes adjacent in the width direction in the ceramic body; and
    the lead portions of the second internal electrodes extend to at least one of the first and second main surfaces.

* * * * *